(12) United States Patent
Kozma et al.

(10) Patent No.: US 11,499,646 B2
(45) Date of Patent: Nov. 15, 2022

(54) BI-STABLE QUICK-RELEASE VALVE

(71) Applicant: KNORR-BREMSE Systeme für Schienenfahrzeuge GmbH, Munich (DE)

(72) Inventors: Marton Kozma, Budaörs (HU); Igor Ibos, Budapest (HU)

(73) Assignee: KNORR-BREMSE Systeme für Schienenfahrzeuge GmbH

( * ) Notice: Subject to any disclaimer, the term of this patent is extended or adjusted under 35 U.S.C. 154(b) by 0 days.

(21) Appl. No.: 17/319,763

(22) Filed: May 13, 2021

(65) Prior Publication Data

US 2021/0404569 A1 Dec. 30, 2021

(30) Foreign Application Priority Data

May 13, 2020 (EP) .................................... 20174402

(51) Int. Cl.
| | |
|---|---|
| *F16K 15/18* | (2006.01) |
| *B60T 15/02* | (2006.01) |
| *F16K 15/02* | (2006.01) |
| *F16K 31/00* | (2006.01) |
| *F16K 31/524* | (2006.01) |
| *F16K 1/00* | (2006.01) |

(52) U.S. Cl.
CPC .......... *F16K 15/182* (2021.08); *B60T 15/021* (2013.01); *F16K 15/025* (2013.01); *F16K 31/003* (2013.01); *F16K 31/52408* (2013.01); *F16K 1/00* (2013.01)

(58) Field of Classification Search
CPC ...... B60T 15/02; B60T 15/021; B60T 15/024; B60T 15/52; B60T 15/54; F16K 1/00; F16K 31/56

USPC ........................... 251/75, 297, 319, 320, 321
See application file for complete search history.

(56) References Cited

U.S. PATENT DOCUMENTS

| | | | | |
|---|---|---|---|---|
| 1,568,159 | A | * | 1/1926 | Heywood ............... F16K 21/04 251/321 |
| 2,200,396 | A | * | 5/1940 | Martin ..................... H01Q 1/10 91/466 |
| 2,285,655 | A | * | 6/1942 | Heinemann ............. F16K 21/14 251/113 |

(Continued)

FOREIGN PATENT DOCUMENTS

| | | |
|---|---|---|
| AT | 106282 B | 4/1927 |
| CN | 203585347 U | 5/2014 |

(Continued)

OTHER PUBLICATIONS

Translation of EP1132275 (Year: 2021).*

*Primary Examiner* — Robert K Arundale
(74) *Attorney, Agent, or Firm* — Barnes & Thornburg LLP

(57) ABSTRACT

A valve for applying an emergency brake of a rail vehicle includes a valve housing, an actuation member to be activated by a user, an actuation rod connecting the actuation member with a valve head, wherein the valve head is adapted to abut on a valve seat, a guidance for guiding the actuation rod being provided within the valve housing, and a first spring adapted to push the valve head against the valve seat, wherein the actuation rod includes a first groove and a second groove, and wherein a first following member is provided between the actuation rod and the guidance, being adapted to stably rest in the first groove or the second groove.

12 Claims, 3 Drawing Sheets

(56) References Cited

U.S. PATENT DOCUMENTS

| | | | | |
|---|---|---|---|---|
| 3,879,091 A | * | 4/1975 | Bridwell | B60T 13/22 |
| | | | | 303/71 |
| 4,451,095 A | * | 5/1984 | Chichester | B60T 15/02 |
| | | | | 303/71 |
| 6,186,477 B1 | * | 2/2001 | McCombs | A61M 16/20 |
| | | | | 128/205.24 |

FOREIGN PATENT DOCUMENTS

| | | |
|---|---|---|
| DE | 3544965 A1 | 6/1987 |
| DE | 19913380 C1 | 5/2000 |
| DE | 102007005980 A1 | 8/2008 |
| EP | 0491172 A1 | 6/1992 |
| EP | 1132275 A2 | 9/2001 |
| GB | 808577 A | 2/1959 |
| GB | 2159249 A | 11/1985 |

* cited by examiner

BI-STABLE QUICK-RELEASE VALVE

CROSS REFERENCE AND PRIORITY CLAIM

This application claims the benefit of priority of European Patent Application No. 20174402.6, filed May 13, 2020, the disclosure of which being incorporated herein by reference in their entireties.

FIELD

Disclosed embodiments relate to a quick-release valve for a train in order to provide a safety-lock release mechanism and an electrical feedback.

BACKGROUND

Quick-release valves are usually installed in a driver's cab of railway vehicles and are used for brake actuation in the case of an emergency.

SUMMARY

Disclosed embodiments provide a quick-release valve which avoids or even prevents any unstable ("in-between") valve states.

Disclosed embodiments include a valve in particular for applying an emergency brake of a rail vehicle, wherein the valve includes a valve housing, an actuation member which is suitable to be activated by a user, an actuation rod connecting the actuation member with a valve head, wherein the valve head is adapted to abut on the valve seat, a guidance for guiding the actuation rod being provided within the valve housing, a first spring which is adapted to push the valve head against the valve seat, wherein the actuation rod includes a first groove and a second groove, and furthermore, a first following member is provided between the actuation rod and the guidance, being adapted to stably rest in the first groove or the second groove.

BRIEF DESCRIPTION OF THE FIGURES

In the following, a disclosed embodiment will be explained more in detail with reference to the appended figures.

DETAILED DESCRIPTION

Figure 1:
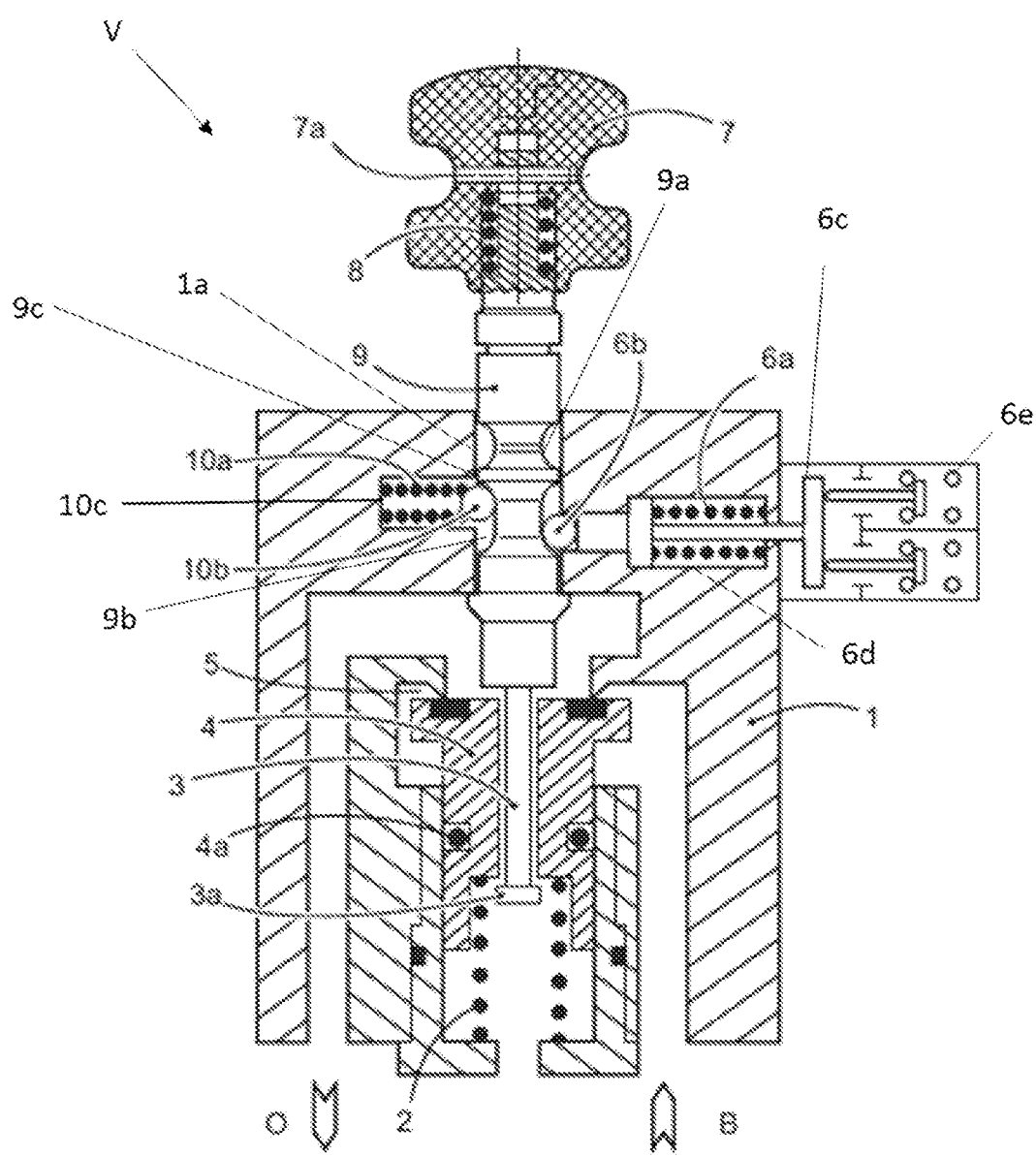
FIG. 1 is a cross-sectional representation of the valve according to the presently disclosed embodiments in a neutral, non-actuated position.

In prior art, a braking system for commercial vehicles is shown in document DE 35 44 965 A1, inter alia including an emergency brake valve, connected to a compressed air reservoir. This emergency brake valve includes an actuation knob which can be actuated with a hand or a foot and is adapted to initiate an emergency braking. The knob has a protective cover which has to be removed before the actuation of the emergency brake valve.

Furthermore, document AT 106282 B1 is known from the prior art, disclosing an emergency brake valve for rail vehicles with a very simple design. This emergency brake valve includes a closing body being designed as hinged cover which is held on an elastic sealing ring by a self-locking angle lever. When the angle lever is pulled back, the closing body is forcibly lifted and then released, so that it is completely opened by the pressure of the braking line.

Quick-release valves as known from prior art enable provoking a partial and temporary valve opening if the actuating force is lower than a specified trigger force. As a result, the pressure in the brake pipe starts decreasing, but it is possible that it stops suddenly if the valve is re-closed, which results in that the brakes are released again.

Also, it is possible that electrical switches have already been actuated after a partial and temporary valve opening and will continue in an emergency brake actuation signal, even though an emergency braking is no longer present.

Hence, quick-release valves of prior art may have a state when they are not fully opened or closed, and then, it is possible that they return to their initial state. Prior art quick-release valves hence have clear disadvantages and cannot be handled safely. Furthermore, it is possible that they cannot be fully actuated or are pushed back to the initial position during actuation.

Hence, prior art quick-release valves have clear disadvantages. Thus, disclosed embodiments provide a quick-release valve which avoids or even prevents any unstable ("in-between") valve states. This technical problem is solved by a bistable quick-release valve with the features of disclosed innovation.

Disclosed embodiments include a valve in particular for applying an emergency brake of a rail vehicle, comprising a valve housing, an actuation member which is suitable to be activated by a user, an actuation rod connecting the actuation member with a valve head, wherein the valve head is adapted to abut on the valve seat, a guidance for guiding the actuation rod being provided within the valve housing, a first spring which is adapted to push the valve head against the valve seat, wherein the actuation rod includes a first groove and a second groove, and furthermore, a first following member is provided between the actuation rod and the guidance, being adapted to stably rest in the first groove or the second groove.

The position of the first following member within the first groove or the second groove determines whether the actuation rod and hence the whole valve assembly is in the neutral position or the actuated position.

Hence, the valve according to the disclosed embodiments is a bi-stable quick-release valve, because it does not allow any unstable, "in-between" valve states. The bi-stable quick-release valve opens without delay upon reaching a specified actuation force, and reduces the pressure in the brake pipe with the required pressure gradient. If the actuation force with which the actuation member of the valve is actuated is below a specified trigger force, there is no pressure decrease in the brake pipe pressure, because the valve does not open. Either, a specified trigger force is applied and the valve fully opens, or a specific trigger force is not reached, and then the valve does not open. However, under no circumstance an in-between state can occur.

Optionally, a second following member is provided between the actuation rod and the guidance. This member actuates a switch or more switches which has/have two positions which can hence indicate an emergency brake signal.

Optionally, the first groove and/or the second groove are radial grooves and extend around the circumference of the actuation rod.

Optionally, a ridge is provided between the first groove and the second groove. This ridge Optionally has a sharp edge so that at least the first following member cannot stably rest on or nearby the ridge, but push the actuation rod either to the neutral or to the actuated position so that the first following member either rests and is otherwise pushed in in the first groove or in the second groove of the actuation rod.

Optionally, the first groove and/or the second groove have a semi-circular or semi-elliptical shape.

Optionally, the first following member and the second following member have a spherical or ellipsoidal shape. Optionally, they are made of metal, e.g. steel.

Optionally, the first following member is pressed against the actuation rod by a second spring which rests in the valve housing. Optionally, the second following member is pressed against the actuation rod by a third spring which rests in the valve housing.

This design of the following members and the grooves allows that at least the first, and optionally also the second following member are pushed and pressed by the respective springs (second spring and third spring) against the actuation rod. Hence, a certain frictional force in the upward or downward direction on the valve actuation rod is generated. The spring force(s) and the frictional force(s) result in the fact that a certain trigger force is required in order to actuate the actuation member.

Optionally, the first following member is adapted to be able to stably rest in the first groove or the second groove, and/or the second groove is adapted that both the first following member and second following member are able to stably rest in it. Hence, the second groove has a greater longitudinal extension compared to the first groove.

Optionally, there is a connection member between the third spring and the second following member which is adapted to actuate an electrical switch.

In this way, one or more electrical switch(es) can be actuated, and a warning signal can be provided that an emergency brake has been initiated.

The actuation of the electrical switch(es) is carried out via the displacement of the second following member, which is also driven by the grooves and the ridge of the valve actuation rod. In particular, the shape of the valve actuation rod, in particular dominated by the shape of the first groove and the second groove and the ridge, enables that the second following member rather rests in the first groove or in the second groove. The second following member, however, cannot rest on the ridge, but would be pushed into the first groove or the second groove, respectively. In particular due to this design of the valve actuation member, there is only a neutral position and an actuated position of the valve, i.e. there are two positions. A dead point can be avoided, as the first following member 10b cannot stably rest on the ridge 9c. Optionally, the actuation member has a hole which is adapted to receive the upper part of the actuation rod, wherein a fourth spring is arranged between the actuation member and the upper part of the actuation rod.

If the actuation member is moved downward due to the impact force and the fourth spring starts to be compressed, the force is insufficient in order to actuate the whole actuation rod, as the frictional force exerted onto the actuation rod by the first following member is higher than the force exerted by the fourth spring. Hence, if the actuation member is actuated accidentally, the actuation rod is at first not actuated. Optionally, the frictional force between the actuation rod and the first following member is higher than the force needed to fully compress the fourth spring. This even enhances the previously described effect.

Optionally, the diameter of the guidance of the valve head is smaller than the diameter of the sealing edge of the valve seat.

By this measure, the valve is over-compensated. Because of this over-compensated design of the valve seat, as soon as the valve head is lifted, the resultant pneumatic forces will change the direction and will enhance a further lifting of the valve head.

By overcoming the forces that hold the valve in a closed state, the valve then suddenly opens—a counter-force from the brake pipe pressure is then eliminated. In this way, the downward force, which predominates significantly, accelerates the valve actuation towards the end position.

Optionally, the valve is adapted to open and/or close the channel between a brake pipe pressure and the atmosphere, so that in an emergency case, the brake pipe pressure can be evacuated and the emergency brake will become active.

The bi-stable quick-release valve V according to one embodiment in a neutral state is shown in FIG. 1.

An actuation rod 9 is slidably accommodated in a guidance 1a of a valve housing.

The actuation rod 9 is connected with a valve head 4 via a connecting element 3. The connecting element 3 is a part of the valve actuation rod 9, which extends below the valve head 4. There is a pre-defined gap between a buffer plate 3a and the related contact surface of the valve head 4. The valve head 4 is slidably arranged on the connecting element 3.

The valve head 4 has a sealing 4a, which is disposed between the valve housing 1 and the valve head 4. Furthermore, a first spring 2 is arranged between the valve housing 1 and the valve head 4 and urges the valve head 4 against a valve seat 5.

In the guidance 1a of the valve housing 1, where the actuation rod 9 is guided, there is a recess 10c, where a second spring 10a is supported; the second spring 10a presses a first following member 10b, which has a spherical shape, against the actuation rod 9. The recess 10c is arranged orthogonally relative to the guidance 1a.

Similarly, there is a further recess 6d on the other side of the valve housing 1, where a connecting element 6c rests. The recess 6d is also arranged orthogonally relative to the guidance 1a. A third spring 6a is arranged between the connecting element 6c and the valve housing 1, which urges the connecting element 6c in the direction of the actuation rod 9. The connecting element 6c is able to press a second following member 6b, which also has a spherical shape, against the actuation rod 9. The connecting element 6c is further connected to one or more electrical switch(es) 6e, and the movement of the connecting element 6c can actuate the switch(es) 6e. Here, the switch(es) 6e is/are in the non-actuated position.

That part of the actuation rod 9 that is accommodated in the guidance 1a has two grooves: a first groove 9a and a second groove 9b. The first groove 9a is arranged above the second groove 9b. Between the first groove 9a and the second groove 9b, there is a ridge 9c. The first groove 9a has a semi-circular cross-section, and the second groove 9b has a semi-elliptical cross-section. In the neutral state which is depicted in FIG. 1, both, the first following member 10b and the second following member 6b rest in the second groove 9b, as they are biased against it via the second spring 10a and the third spring 6a, respectively. The forces exerted by the second spring 10a and the third spring 6a to the actuation rod and furthermore the frictional forces result in the fact that a specific trigger force needs to be exerted on the actuation rod 9 in the upward or downward direction in order to move the actuation rod 9 in the upward or downward direction.

The first groove 9a and the second groove 9b and the ridge 9c form a guide track on the actuating rod 9, in which the first following member 10b and the second following member 6b are guided. When the first following member 10b surpasses the dead point (i.e. the ridge 9c) on the guide track, the force exerted by the biasing of the second spring 10 causes the actuation rod 9 to move downward. This simultaneously causes the second following member 6b to be pushed into the recess 6d and actuate the switch(es) 6e.

On the upper part of the actuation rod 9, an actuation member 7 is provided. The actuation member 7 is connected to the actuation rod 9 by a fourth spring 8. Also, there is a straight pin 7a, which is able to secure the actuation member 7 in its neutral position, and to the actuation rod 9. This allows a downward movement of the actuation member 7. The movement is limited by the contact between the actuation member 7 and the top surface of the actuation rod 9.

If the actuation rod 9 is pressed downwards, the shape of the second groove 9b forces the first following member 10b to compress the second spring 10a. Hence, if the actuation rod 9 is moved downwards, the first following member 10b is pressed and moved into the recess 10c.

Figure 2:
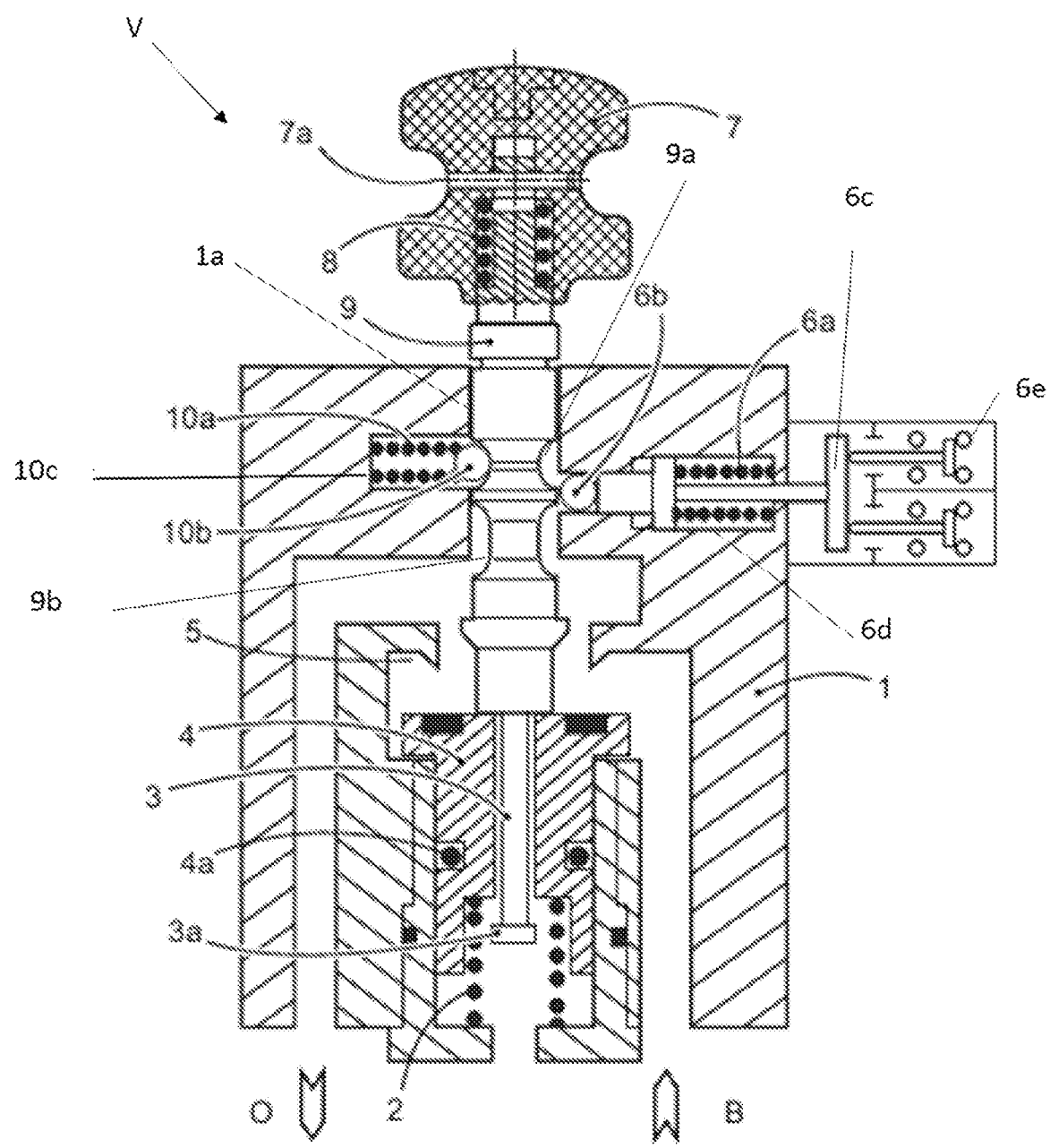
FIG. 2 shows a cross-sectional representation of a valve according to the presently disclosed embodiments in an actuated position.

FIG. 2 shows the bi-stable quick-release valve V of FIG. 1 in an actuated position. Herein, the actuation rod 9 has moved downwards and has moved the valve head 4 to an opened position, so that there is a passage between the brake pipe B and the atmosphere O. Now, the first following member 10a rests in the first groove 9a, and the second following member 6b rests against the ridge 9c. Furthermore, the second following member 6b and the connecting element 6c have been pushed back and the spring 6a is compressed. The switch(es) 6e is/are in the actuated position.

Figure 3:
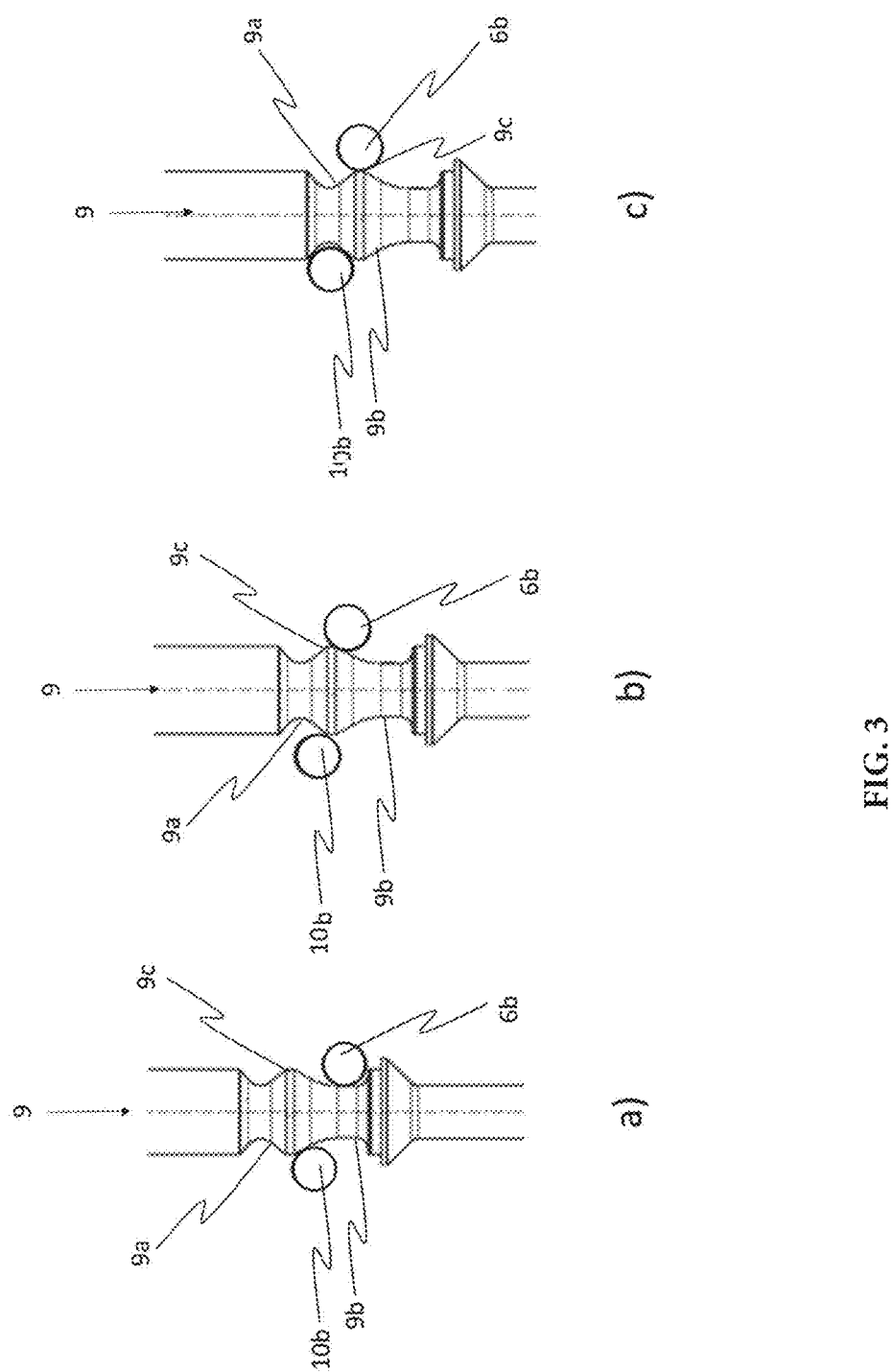
FIG. 3 shows a detailed view in the arrangement of the first following member and the second following member and the actuation rod in a neutral position, the dead point and in an actuated position.

FIG. 3 shows a detailed view of the actuation rod 9 together with the first following member 10b and the second following member 6b. Also, the first groove 9 and the second groove 9b and their specific shape and the ridge 9c are shown in detail in FIG. 3.

FIG. 3 a) shows the valve V in its neutral position. Herein, both, the first following member 10b and the second following member 6b rest in the second groove 9b, which has a quasi-elliptical shape. The first following member 10b is disposed above the second following member 6b. The second following member 6b is disposed at the lower part of the second groove 9b.

Hence, the actuation rod 9 is forced into the lock-in position by the first following member 10b due to the design of the grooves 9a, 9b and the ridge 9c. The resultant force of the following members 10b, 6b press the actuation rod 9 up against the valve housing 1 (not shown here). Furthermore, it can be seen that the actuation rod 9 together with its grooves 9a, 9b and its ridge 9c are axis-symmetrical, and hence a rotation around the main axis is permitted.

FIG. 3 b) shows the actuation rod 9 in the dead point. Herein, compared to FIG. 3 a), the actuation rod 9 has moved downwards. The first following member 10b is disposed shortly above the ridge 9c and hence has passed the ridge 9c. The second following member 6b is shortly below the ridge 9c. The force exerted onto the first following member 10b by the second spring 10a (not shown here) pushes the actuation rod 9 in a downward direction while pushing the first following member 10b into the first groove 9a. The resultant force is split into a vertical and a horizontal component.

FIG. 3 c) shows the actuation rod 9 in the actuated position. Herein, the first following member 10b is disposed in the first groove 9a and snuggly fits into it. The second following member 6b however is directly at the ridge 9c. However, as the first following member 10b has reached a stable position, the second following member 6b does not move any more.

In the following, the actuation and the operation of the quick-release valve according to the disclosed embodiments is described more in detail:

If the actuating force is less than the specified trigger force in a neutral position, the bi-stable quick-release valve V shall not induce a drop in the brake pipe pressure B, and the bi-stable quick-release valve V will not generate an electrical signal by the switch(es) 6e which indicate(s) an emergency brake actuation.

The actuation member 7 moves downward due to the impact force by pushing it and starts compressing the fourth spring 8. However, in this case, the force is insufficient to fully compress the fourth spring 8, so there will be no contact between the actuation member 7 and the top of the actuation rod 9. Hence, the actuation rod 9 will not force the opening of the valve head 4, and also the switch(es) 6e controlled by the actuation rod 9 via the connecting element 6c will not be actuated. Herein, the movement of the valve actuation rod 9 is restricted by counter-forces (frictional forces and spring forces) exerted by the first following member 10b which is pressed against the actuation rod 9 by the second spring 9a. These counter-forces cannot be overcome by the force transferred purely by the fourth spring 8.

If the actuation force is released or discontinued, the actuation member 7 returns to its original position due to the spring force exerted by the fourth spring 8.

If the actuation force becomes greater than the specific trigger force, the bi-stable quick-release valve V will switch abruptly: Due to the force exerted on the actuation member 7, the actuation member 7 will accelerate downwards, while compressing the fourth spring 8. In this case, a contact between the actuation member 7 and the actuation rod 9 will be accomplished. With the valve actuation rod moving downwards, the counter-forces due to the grooves 9a, 9b will increase and will reach the maximum at the dead point. Hence, the actuation rod 9 will not force the opening of the valve head 4, and the switch(es) 6e controlled by the actuation rod 9 via the connecting element 6c will not be actuated either.

To achieve a really bi-stable valve, it has to be ensured that the actuation rod will surpass the dead point automatically. This is indeed ensured by the quick-release valve V of the disclosed embodiments. The full actuation and the sudden opening of the valve head 4 are accomplished by the following four effects:

Pneumatic Forces Acting on the Valve Head 4

The valve actuation rod 9 pushes the valve head 4 before the actuation rod 9 reaches the dead point and opens it against counter-forces of the first spring 2 and the brake pipe pressure B. Because of the over-compensated design of the valve seat 5, as soon as the valve head 4 is lifted, the resulting force of the pneumatic forces will change its direction and will enhance a further lifting of the valve head 4.

As the forces that hold the valve head 4 in a closed state have been overcome, the valve head 4 now suddenly opens—and a counter-force from the brake pipe pressure B is eliminated. By this design, the downward forces, which now predominate significantly, accelerate the valve V actuation downwards towards the end position.

Use of Energy Stored in the Fourth Spring 8

The downward movement of the valve actuation rod 9 and the valve head 4 is complemented by the expansion of the fourth spring 8, so that the whole valve actuation rod 9 can pass the dead point. Hence, the energy invested during actuation of the actuation member 7 is transmitted by the fourth spring 8 to the actuation rod 9 and the valve head 4 when additional energy is needed to push the actuation rod 9 over the dead point, i.e. the ridge 9c.

Use of the Kinetic Momentum of the Valve Head 4

As soon as the valve head 4 opens, pneumatic forces exerted by the brake pipe pressure B further accelerate the lifting of the valve head 4. Hence, the momentum of the valve head 4 is transmitted by the connecting element 3 and the buffer plate 3a to the actuation rod 9, thereby facilitating surpassing of the dead point and thus causing the final actuation of the valve actuation rod 9. This means that the forces that push the valve actuation rod 9 downwards, can overcome the counter-force as exerted to the valve actuation rod by the first following member 10b and also the second following member 6b. The inertia of the downward moving parts prevents a deadlock between the two stable positions of the valve. Hence, only two stable positions are possible.

Use of Energy Stored in the First Following Member 10b and the Second Spring 10a Once the first following member 10b surpasses the dead point on the ridge 9c, it will force the further downward movement of the actuation rod 9.

Due to the above-mentioned facts, the opening of the valve V is stable and proceeds immediately. If the valve V is opened, the braking line pressure B and the atmospheric pressure O are connected. In the case of an actuated position, the second following member 6a rests below that point on the ridge 9c, and the electrical switch(es) 6e controlled by the valve actuation rod 9 is/are actuated. In this case, the first following member 10b pressed against the actuation rod 9 by the second spring 10a in this position exerts enough force to counteract the force of the first spring 2. Consequently, the bi-stable quick-release valve is stabilized in the actuated position and cannot move back to the neutral position without further forces.

If the bi-stable quick-release valve V should be re-set to the neutral position, the following actions are necessary:

The actuation member 7 must be pulled upwards. The pulling force acting on the actuation rod 9 must be able to overcome the counter-force of the first following member 10b so that the first following member 10b passes from the actuated position through the dead point to the neutral position. Then, also the first spring 2 presses the valve head 4 against the valve seat, and hence, the valve V is closed. The actuated switch(es) 6e controlled by the valve actuation rod 9 is/are then re-set and does not cause an emergency signal any more.

Disclosed embodiments are not limited to the above-mentioned details.

The actuation rod 9 can have any shape and does not have to be rotation-symmetrical. It can have a square-shaped cross-section, and also the grooves 9a, 9b can have a different cross-section, for example a rectangular shape. Also the following members 10b, 6b do not necessarily have to be a spherical shape, they can also have any other shape.

The presently disclosed embodiments may include a valve V in particular for applying an emergency brake of a rail vehicle, comprising a valve housing 1, an actuation member 7 which is suitable to be activated by a user, an actuation rod 9 connecting the actuation member with a valve head 4, wherein the valve head 4 is adapted to abut on a valve seat 5, a guidance 1a for guiding the actuation rod 9 being provided within the valve housing 1, a first spring 2 which is adapted to push the valve head 4 against the valve seat 5, wherein the actuation rod 9 includes a first groove 9a and a second groove 9b, and furthermore, a first following member 10b is provided between the actuation rod 9 and the guidance 1a, being adapted to stably rest in the first groove 9a or the second groove 9b.

The position of the first following member 10b within the first groove 9a or the second groove 9b determines whether the actuation rod 9 and hence the whole valve V assembly is in the neutral position or the actuated position.

Furthermore, there is a second following member 6b, which is pressed against the actuation rod 9 by a third spring 6a which rests in the valve housing 1.

Further, there is a connecting element 6c between the third spring 6a and the second following member 6b, which is adapted to actuate one or more electrical switch(es) 6e, with which an emergency signal can be output.

Hence, the valve V according to the presently disclosed embodiments may be a bi-stable quick-release valve, because it does not allow any unstable, "in-between" valve states. The bi-stable quick-release valve of the presently disclosed embodiments may open without delay upon reaching a specified actuation force, and reduce the pressure in the brake pipe with the required pressure gradient. If the actuation force with which the actuation member 7 of the valve is actuated is below a specified trigger force, there is no pressure decrease in the brake pipe pressure, because the valve does not open. Either, a specified trigger force is applied and the valve V fully opens, or a specific trigger force is not reached, and then the valve V does not open. However, under no circumstance an in-between state can occur.

REFERENCE SIGN LIST

V Valve
1 Valve housing
1a Guidance
2 First spring
3 Connecting element
3a Buffer plate
4 Valve head
4a Sealing
5 Valve seat
6a Third spring
6b Second following member
6c Connecting element
6d Recess
6e Switch(es)
7 Actuation member
7a Straight pin
8 Fourth spring
9 Actuation rod
9a First Groove
9b Second Groove
9c Ridge
10a Second spring
10b First following member
BP Brake pipe pressure
O Atmosphere

The invention claimed is:

1. A valve for applying an emergency brake of a rail vehicle, the valve comprising:
   a valve housing;
   an actuation member to be actuated by a user;
   an actuation rod, connecting the actuation member with a valve head, wherein the valve head is configured to abut on a valve seat;
   a guidance for guiding the actuation rod being provided within the valve housing,
   a first spring configured to push the valve head against the valve seat, wherein the actuation rod includes a first groove and a second groove; and
   a first following member provided between the actuation rod and the guidance, and being configured to stably rest in the first groove or the second groove,
   wherein a second following member is provided between the actuation rod and the guidance.

2. The valve of claim 1, wherein the first groove and/or the second groove are radial grooves and extend around the circumference of the actuation rod.

3. The valve of claim 1, wherein a ridge is provided between the first groove and the second groove.

4. The valve of claim 1, wherein the first groove and/or second groove have a semi-circular or a semi-elliptical shape.

5. The valve of claim 1, wherein the first following member and/or the second following member have a spherical or ellipsoidal shape.

6. The valve of claim 1, wherein the first following member is configured to stably rest in the first groove or the second groove, and/or the first groove is configured that both the first following member and second following member to stably rest in it.

7. The valve of claim 1, wherein the first following member is pressed against the actuation rod by a second spring which rests in the valve housing, and/or wherein the second following member is pressed against the actuation rod by a third spring which rests in the valve housing.

8. The valve of claim 7, wherein there is a connecting element between the third spring and the second following member, which is configured to actuate one or more electrical switch, wherein the connecting element is accommodated in a recess provided within the valve housing.

9. The valve of claim 1, wherein the actuation member has a hole which is configured to receive the upper part of the actuation rod, wherein a fourth spring is arranged between the actuation member and the upper part of the actuation rod.

10. The valve of claim 9, wherein the resultant force between the actuation rod and the first following member is higher than the force needed to fully compress the fourth spring.

11. The valve of claim 1, wherein the diameter of the guidance of a valve head is smaller than the diameter of the sealing edge of the valve seat.

12. The valve of claim 1, wherein the valve is configured to open and/or close the channel between a brake pipe pressure line and the atmosphere.

* * * * *